US011874392B2

(12) United States Patent
Narayana Moorthy et al.

(10) Patent No.: US 11,874,392 B2
(45) Date of Patent: Jan. 16, 2024

(54) NON-ACTIVE CHIRP DITHERING IN FMCW RADAR

(71) Applicant: Texas Instruments Incorporated, Dallas, TX (US)

(72) Inventors: Shankar Ram Narayana Moorthy, Bengaluru (IN); Karthik Subburaj, Bengaluru (IN); Shailesh Joshi, Bengaluru (IN); Piyush Soni, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 276 days.

(21) Appl. No.: 17/498,342

(22) Filed: Oct. 11, 2021

(65) Prior Publication Data

US 2023/0017031 A1   Jan. 19, 2023

(51) Int. Cl.
*G01S 7/28*   (2006.01)
*G01S 7/35*   (2006.01)

(52) U.S. Cl.
CPC ............ *G01S 7/2813* (2013.01); *G01S 7/352* (2013.01)

(58) Field of Classification Search
CPC ...... G01S 7/023; G01S 7/0232; G01S 7/0235; G01S 7/352; G01S 7/2813; G01S 7/4861; G01S 13/22; G01S 13/222; G01S 13/286
See application file for complete search history.

(56) References Cited

U.S. PATENT DOCUMENTS

2005/0179582 A1 *  8/2005  Woodington ......... G01S 7/0232
                                               342/128

2020/0284874 A1 *  9/2020  Narayana Moorthy ...................
                                               G01S 7/0234

FOREIGN PATENT DOCUMENTS

| EP | 1879045 A2 | 1/2008 | |
|---|---|---|---|
| EP | 3343773 A1 * | 7/2018 | ........... G01S 13/343 |
| EP | 3410150 A1 | 12/2018 | |
| WO | 2020180911 A1 | 9/2020 | |

OTHER PUBLICATIONS

International Search Report, PCT/US2022/036619, dated Dec. 10, 2022, 5 pages.

* cited by examiner

*Primary Examiner* — Vladimir Magloire
*Assistant Examiner* — Maxine Mckenzie Phillips
(74) *Attorney, Agent, or Firm* — Michael T. Gabrik; Frank D. Cimino (57) ABSTRACT

A non-transitory computer-readable storage device stores machine instructions which, when executed by a processor, cause the processor to determine a chirp period Tc for radar chirps in a radar frame. The chirp period Tc comprises a rising period Trise and a falling period Tfall. The processor determines, for each radar chirp in the radar frame, a corresponding randomized frequency characteristic during Tfall, and causes a radar sensor circuit to generate the radar chirps in the radar frame based on Tc, Trise, Tfall, and the corresponding randomized frequency characteristics. In some implementations, the machine instructions to determine the corresponding randomized frequency characteristic comprise machine instructions to determine a frequency step having a frequency f_step and a period Tstep. At least one of the frequency f_step and the period Tstep is dithered across radar chirps in the radar frame.

24 Claims, 11 Drawing Sheets

NON-ACTIVE CHIRP DITHERING IN FMCW RADAR

CROSS-REFERENCE TO RELATED APPLICATIONS

This application claims priority to India Provisional Application No. 202141031320, filed Jul. 13, 2021, which is hereby incorporated by reference.

BACKGROUND

Many driving assistance systems implement frequency modulated continuous wave (FMCW) radar systems to aid in collision warning, blind spot warning, lane change assistance, parking assistance, and rear collision warning. The basic transmit signal of FMCW radar is a frequency ramp, also commonly known as a "chirp." A chirp is a signal whose frequency varies linearly with time. For example, a millimeter wave radar system might transmit a chirp with a 4 GigaHerz (GHz) bandwidth that starts at 77 GHz and linearly increases to 81 GHz. The transmitted chirp reflects off one or more objects, and the reflected signal is received at one or more receiver antennas. An FMCW radar system transmits a series of these equally spaced chirps in a unit called a frame. The reflected signal is down-converted to generate an intermediate frequency (IF) signal, which is digitized and then processed to obtain the range, velocity, and angle of arrival for objects in front of the radar system. For example, a frequency of the IF signal is proportional to an object's range, while a phase of the IF signal is indicative of the object's velocity.

A spurious signal, or spur, is an unintended signal that can result from harmonics, intermodulation, frequency conversion, or electromagnetic interference. A reflected, fixed frequency spur can be mixed with the transmitted chirp signal and introduce errors into the radar system's signal processing, such that "ghost" targets are erroneously identified at different distances and constant velocities.

SUMMARY

A non-transitory computer-readable storage device stores machine instructions which, when executed by a processor, cause the processor to determine a chirp period Tc for radar chirps in the radar frame. The chirp period Tc includes a rising period Trise and a falling period Tfall. The processor determines, for each radar chirp in the radar frame, a corresponding randomized frequency characteristic during Tfall and causes a radar sensor circuit to generate the radar chirps in the radar frame based on Tc, Trise, Tfall, and the corresponding randomized frequency characteristics.

In some implementations, the machine instructions to determine the corresponding randomized frequency characteristic comprise machine instructions to determine a frequency step having a frequency f_step and a period Tstep. At least one of the frequency f_step and the period Tstep is dithered across radar chirps in the radar frame. In some implementations, the machine instructions to determine the corresponding randomized frequency characteristic comprise machine instructions to adjust, for each radar chirp in the radar frame, a corresponding idle period Tidle based on the period Tstep to maintain the chirp period Tc.

In some implementations, the instructions to cause the radar sensor circuit to generate the radar chirps include machine instructions for each radar chirp in the radar frame to transition the radar chirp from a starting frequency to an ending frequency during the rising period Trise. The processor then maintains the radar chirp at the frequency f_step for the period Tstep before transitioning the radar chirp from the frequency f_step to the starting frequency during the falling period Tfall. In some implementations, the machine instructions to cause the radar sensor circuit to generate the radar chirps include machine instructions for each radar chirp in the radar frame to transition the radar chirp from a starting frequency to an ending frequency during the rising period Trise. The processor then transitions the radar chirp from the ending frequency to the starting frequency during the falling period Tfall, before maintaining the radar chirp at the frequency f_step for the period Tstep.

In some implementations, the instructions to cause the radar sensor circuit to generate the radar chirps include machine instructions for each radar chirp in the radar frame to transition the radar chirp from a starting frequency to an ending frequency during the rising period Trise. The processor then transitions the radar chirp from the ending frequency to the frequency f_step during a first portion of the falling period Tfall, and maintains the radar chirp at the frequency f_step during a second portion of the falling period Tfall for the period Tstep. The processor then transitions the radar chirp from the frequency f_step to the starting frequency during a third portion of the falling period Tfall.

In some implementations, the machine instructions to determine the frequency step include instructions to determine a skipping frequency f_skip. At least one of the frequency f_step, the period Tstep, and the skipping frequency f_skip is dithered across radar chirps in the radar frame. The machine instructions to cause the radar sensor circuit to generate the radar chirps include machine instructions for each radar chirp in the radar frame to transition the radar chirp from a starting frequency to an ending frequency during the rising period Trise. The processor then transitions the radar chirp from the ending frequency to the skipping frequency f_skip during a first portion of the falling period Tfall and maintains the radar chirp at the frequency f_step during a second portion of the falling period Tfall and for the period Tstep. The processor then transitions the radar chirp from the skipping frequency f_skip to the starting frequency during a third portion of the falling period Tfall.

In some implementations, the machine instructions to determine the corresponding randomized frequency characteristic include machine instructions to determine a length of the falling period Tfall. The length of the falling period Tfall is dithered across radar chirps in the radar frame.

In some implementations, an apparatus includes the non-transitory computer-readable storage device and a processor. The apparatus also includes the radar sensor circuit in some embodiments. The radar sensor circuit includes a synthesizer phase locked loop (PLL), a frequency multiplier coupled to the synthesizer PLL, a transmitter circuit coupled to the frequency multiplier, a receiver circuit, and a baseband processor coupled to the receiver circuit and the frequency multiplier. In some implementations, the apparatus includes a chirp controller with a linear feedback shift register circuit to determine the corresponding randomized frequency characteristics of the radar chirps.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

The disclosed radar systems mitigate the effects of fixed frequency spurs by dithering frequency characteristics of chirp signals in a radar frame during inactive, non-sampling periods of the chirps, the effects of which are cancelled out during down-conversion and do not affect the coherence of received signals. The radar systems determine a chirp period Tc for radar chirps in the radar frame. The chirp period Tc includes a rising period Trise, which includes a sampling period, and a falling period Tfall, which is predominantly a non-sampling period. In some implementations, the chirp period Tc also includes an optional idle period Tidle. The radar systems determine a corresponding randomized frequency characteristic during Tfall for each radar chirp in the radar frame and generate the radar chirps based on Tc, Trise, Tfall, and the corresponding randomized frequency characteristics.

In some implementations, the randomized frequency characteristic is a frequency step having a frequency f_step and a period Tstep, and at least one of f_step and Tstep are dithered across radar chirps in the radar frame. The frequency step can also include a skip frequency f_skip at which the radar chirp skips to the frequency f_step. In other implementations, the randomized frequency characteristic is a length of the falling period Tfall, and the length of Tfall is dithered across radar chirps in the radar frame.

Figure 1:
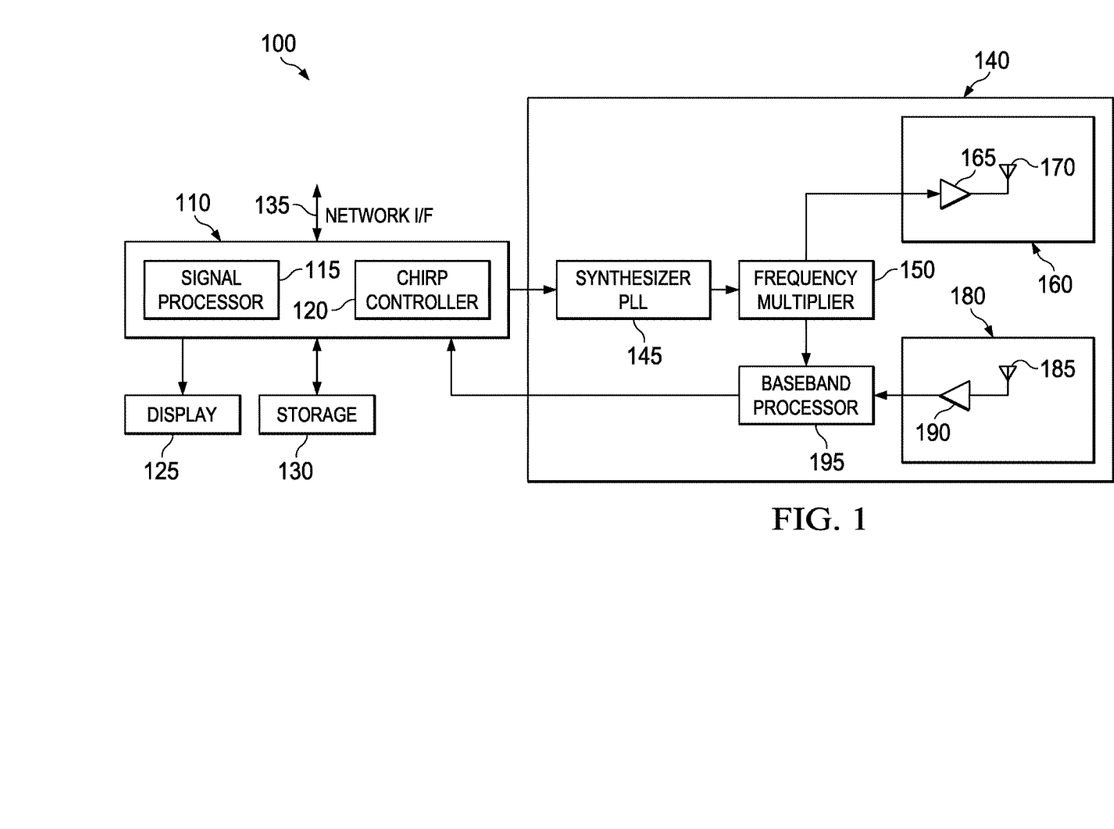
FIG. 1 shows a block diagram of an example radar system.

FIG. 1 shows a block diagram of an example radar system 100. Radar system 100 may be used in a vehicle, such as for a driver assistance system in an automobile. In this example, radar system 100 includes a central processor unit (CPU) 110, a display 125, a storage 130, and a radar sensor circuit 140. Radar sensor circuit 140 includes a synthesizer phase locked loop (PLL) 145, a frequency multiplier 150, a transmitter 160, a receiver 180, and a baseband processor 195. The transmitter 160 includes a power amplifier 165 that drives a transmitter (TX) antenna 170. The receiver 180 includes a receiver (RX) antenna 185 and a low noise amplifier (LNA) 190. A baseband processor 195 filters the received signals that are reflected from objects in the path of the transmitted chirp signals.

In this example radar system 100, transmitter 160 operates in the 77 GHz region and produces a frequency modulated continuous wave (FMCW) signal. The continuous wave signal is frequency modulated to form a series of chirps using the synthesizer PLL 145 and the frequency multiplier 150. In example radar system 100, the transmitter 160 and the receiver 180 include a single TX antenna 170 and a single RX antenna 185, respectively. In other examples, the transmitter 160 and the receiver 180 include antenna arrays of two or more TX antennas or two or more RX antennas, respectively. In example radar system 100, the TX antenna 170 and RX antenna 185 are stationary. In other examples, the antenna arrays may be configured to transmit and receive across a range of area, such as by mechanical movement.

FMCW radar, also referred to as continuous-wave frequency-modulated (CWFM) radar, is capable of determining distance, velocity, and angle of arrival of a target. In a FMCW system, the transmitted chirp signal of a known stable frequency continuous wave varies up and down in frequency over a fixed period of time by a modulating signal. Received reflections from the target object are then mixed with the transmitted chirp signal to produce an intermediate frequency (IF) signal, which will give the distance, velocity, and angle of arrival for the target object after signal processing. Frequency differences between the received reflections and the transmitted chirp signal increase with delay and are therefore proportional to distance.

The phase differences between the received reflections across consecutive chirps allow the velocity of target objects to be computed. The phase differences between the received reflections at a first receiver antenna and the received reflections at a second receiver antenna allow the angle of arrival of target objects to be computed. Thus, with an FMCW radar system, the distance between the target object and the radar system, the relative velocity of the target object, the relative angle of the target object and the like can be calculated.

During normal operation, linear frequency chirps are transmitted, and reflected signals are received. The received reflections are down-converted into the baseband in baseband processor 195 using a copy of the transmitted signal from frequency multiplier 150. The baseband signals are then filtered and amplified by filters and variable gain amplifiers by baseband processor 195. After converting the baseband signals into the digital domain, time domain to frequency domain transforms such as fast Fourier transforms (FFTs) may be applied and other signal processing performed in order to determine the distance, velocity, and angle of arrival between the target object and the radar system 100. For example, the down-converted and digitized received signal corresponding to each chirp is first transformed using an FFT (called the range FFT). The range FFT produces a series of range bins with the value of each range bin denoting the signal strength of reflected targets at the corresponding range. A Doppler FFT is then performed for each range bin across all the chirps in a frame to estimate the velocities of reflected targets.

CPU 110 comprises one or more CPU cores, digital signal processors, application specific integrated circuits, and the like. The term "CPU" (singular) is used herein to refer to either a single or multiple CPU cores, and to broadly describe central processing units, digital signal processors, application specific integrated circuits, and the like. CPU 110 includes a chirp controller 120 that receives a stream of data from the radar sensor circuit 140 and performs chirp generation and control of the transmitter 160. A varying voltage tuning control signal from CPU 110 is used to control the synthesizer PLL 145. CPU 110 also includes a signal processor 115 that may perform signal processing for determining a velocity, an angle of arrival, distance between the target object and radar system 100, and the like.

Signal processor 115 can provide the determined values to display 125 and/or communicate with other systems via a network interface (I/F) 135. Network 135 may include various combinations of local area networks (LANs), wide area networks (WANs), the internet and/or other known or later developed wired or wireless communication mechanisms, for example. Storage 130 may be used to store instructions and data received from radar sensor circuit 140 or signal processor 115. Storage 130 may be any appropriate storage medium, such as a static random access memory (SRAM).

Figure 2:
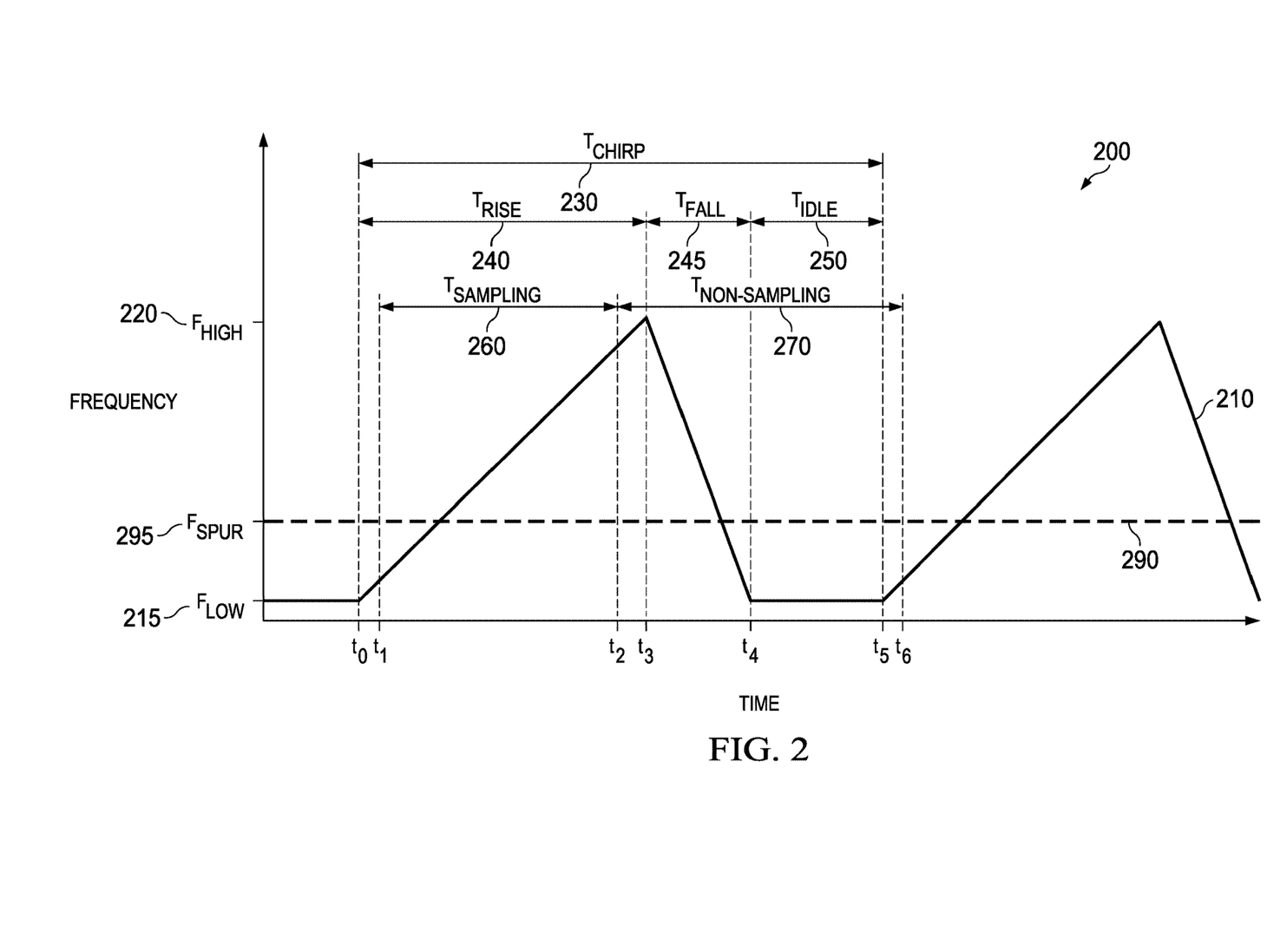
FIG. 2 illustrates waveforms of undithered chirp signals and a fixed frequency spur in accordance with an example.

FIG. 2 illustrates waveforms 200 of an undithered chirp signal 210 and a fixed frequency spur 290 in accordance with an example. For ease of explanation, the undithered chirp signal 210 and fixed frequency spur 290 are described herein with reference to radar system 100 shown in FIG. 1. The undithered chirp signal 210 has a period Tchirp 230 from time t0 to time t5, which can be divided into a rising period Trise 240, a falling period Tfall 245, and an optional idle period Tidle 250. The rising period Trise 240 occurs between time t0 and time t3, and the frequency of undithered chirp signal 210 increases from a first, lower frequency f_low 215 at time t0 to a second, higher frequency f_high 220 at time t3. The falling period Tfall 245 occurs between time t3 and time t4, and the frequency of undithered chirp signal 210 decreases from f_high 220 at time t3 to f_low 215 at time t4. The optional idle period Tidle 250 occurs between time t4 and time t5, and the frequency of undithered chirp signal 210 remains constant at f_low 215.

Although the chirp signal 210 has an increasing frequency from f_low 215 to f_high 220 during Trise 240, in some implementations the chirp signal 210 has a decreasing frequency from f_high 220 to f_low 215 during Trise 240. In these implementations, the frequency of chirp signal 210 increases from f_low 215 to f_high 220 during Tfall 245, and stays constant at f_high 220 during the optional idle period Tidle 250. The CPU 110 samples the chirp signal 210 for signal processing during a sampling, or active, period Tsampling 260 from time t1 to t2. The remainder of the chirp period Tchirp 230 is a non-sampling or non-active period Tnon-sampling 270 from time t2 to time t6, in which the CPU 110 does not sample chirp signal 210. In this example, Tsampling 260 begins at time t1, shortly after the beginning of Trise 240. Tsampling 260 ends at time t2, before the end of Trise 240.

The fixed frequency spur 290 has a frequency f_spur 295 and is an unintended signal that can result from harmonics, intermodulation, frequency conversion, or electromagnetic interference (EMI). A spur is inserted in the transmitter path as a fixed-frequency signal, for example, by a coupling of a higher-order harmonic of a clock signal to a voltage-controlled oscillator (VCO) or a low-noise amplifier (LNA). The received reflections of the fixed-frequency spur 290 causes the resultant IF signal to change frequency over time, which may be erroneously construed as "ghost" targets at different distances. Further, the fixed frequency spur 290 can cause a continuous phase shift in the IF signal between chirps, and thus may also be erroneously construed as a target having a constant velocity.

Figure 3:
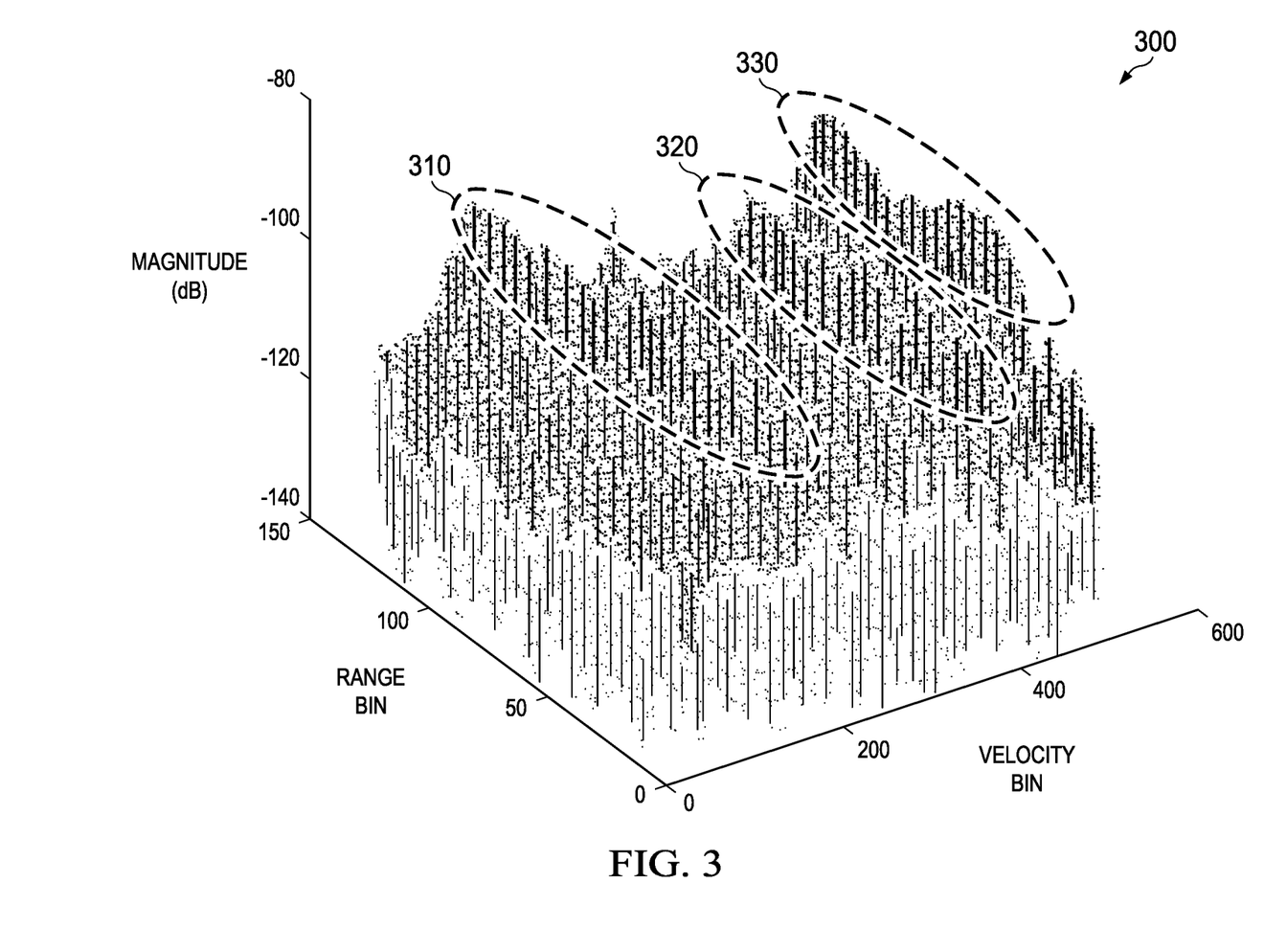
FIG. 3 illustrates a range-velocity plot as a function of signal power for received undithered chirp signals and fixed frequency spurs.

FIG. 3 illustrates a range-velocity plot 300 as a function of signal power in decibels (dB) for a received reflection produced by an undithered chirp signal, such as chirp signal 210 shown in FIG. 2, and three fixed frequency spurs. The received reflections of the three fixed frequency spurs cause the resultant IF signal to change frequency over time, and the range-velocity plot 300 illustrates the erroneously identified "ghost" targets in spur ridges 310, 320, and 330 that span multiple range bins, from zero to 150. In addition, the received reflections of the three fixed frequency spurs cause a continuous phase shift in the IF signal between chirps, and plot 300 illustrates the erroneous constant velocities in spur ridges 310, 320, and 330 for the ghost targets. Dithering the phase of the chirp signal during a non-sampling time such as Tnon-sampling 270 can spread the noise of the fixed frequency spurs across Doppler bins and mitigate the ghost target detection and erroneous velocities.

Figure 4:
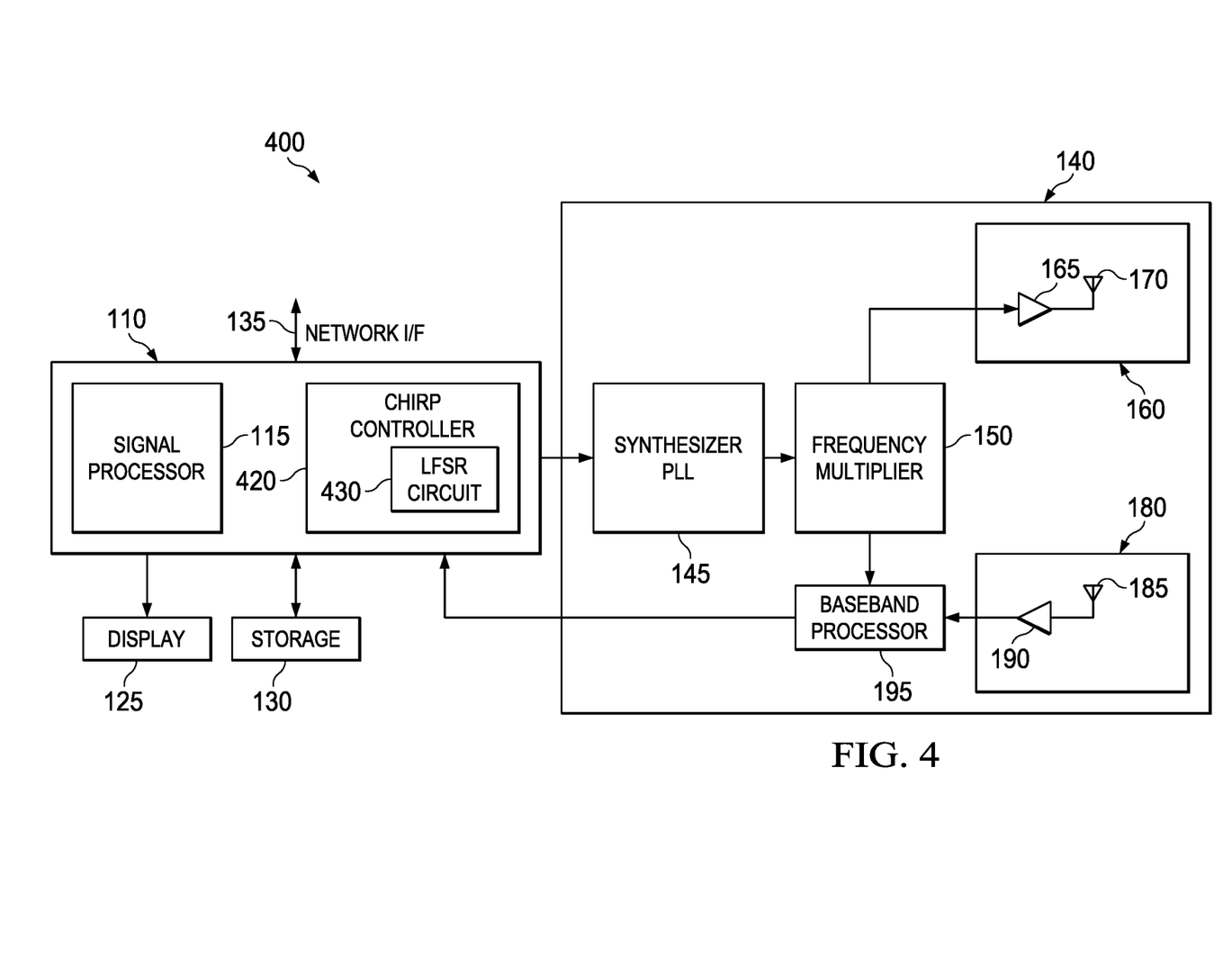
FIG. 4 shows a block diagram of an example radar system configured to perform non-active chirp dithering.

FIG. 4 shows a block diagram of an example radar system 400 configured to perform non-active chirp dithering. The radar system 400 is similar to the radar system 100 shown in FIG. 1, but includes a chirp controller 420 with a linear feedback shift register (LFSR) circuit 430. In this implementation, the chirp controller 420 includes LFSR circuit 430, but any appropriate random or pseudo-random generator circuit may be used. The chirp controller 420 uses the LFSR circuit 430 to randomize or pseudo-randomize frequency characteristics of the generated chirp signals during the non-active times. That is, the chirp controller 420 introduces a frequency step into the non-active period of a chirp signal, in which the frequency of the chirp signal stays constant at a frequency f_step for a period of time Tstep. The frequency f_step and the period Tstep are dithered by the LFSR circuit 430. Examples of dithered frequency steps in the non-sampling period of chirp signals are described further herein with reference to FIGS. 5-10.

The integral of the resulting chirp signal frequency over time is thus randomized to be equal to or greater than one full cycle, which randomizes the initial phase of the synthesizer PLL 145 between zero and 360 degrees for each chirp. The maximum phase dither from chirp to chirp of 360 degrees, or 2π radians, can be used to determine the maximum and minimum dithers in f_step and Tstep. The LFSR circuit 430 randomizes a dither in the frequency f_step between the maximum and minimum f_step dither values as described further herein with respect to FIG. 5, a dither in the period Tstep between the maximum and minimum Tstep dither values as described further herein with respect to FIG. 6, or both to randomize the initial phase initial phase of the synthesizer PLL 145 between zero and 360 degrees.

For example, the frequency f_step can be varied between zero and four MegaHertz (MHz) for a constant period Tstep of 0.25 microseconds (µs). The maximum phase dither is represented as:

$$\text{Maximum phase dither} = 2\pi = 2\pi(4 \text{ MHz})(0.25 \text{ µs})$$

The frequency multiplier 150 provides the chirp signal for transmission to transmitter 160 and to baseband processor 195 for down-conversion. Thus, in the receive chain, the dithered phase of the transmitted signal is cancelled out during down-conversion and does not affect the coherence of the received signal provided to CPU 110 for processing. The phase of the received fixed frequency spur is not dithered however, and down-converting the received fixed frequency spur in the baseband processor 195 with a dithered output of frequency multiplier 150 results in the phase of the received fixed frequency spur being dithered in the resulting IF signal. The disclosed radar systems are better than comparable radar systems that mitigate the effects of fixed frequency spurs by dithering a chirp start frequency, a signal sampling start time, and an idle time between the end of one chirp to the beginning of a subsequent chirp. These techniques reduce the bandwidth of the radar systems and introduce incoherence into the IF signals, requiring additional signal processing to obtain the desired information, while the disclosed radar systems mitigate the effects of fixed frequency spurs without reducing the bandwidth or introducing incoherence.

FIGS. 5-10 illustrate example waveforms of dithered frequency characteristics introduced by LFSR 430 in chirp controller 420 into the non-sampling period of chirp signals. For ease of explanation, the example waveforms in FIGS. 5-10 are described with reference to the waveform 200 shown in FIG. 2 and the radar system 400 shown in FIG. 4. The chirp signals in FIGS. 5-10 are similar to the chirp signal 210, and the fixed frequency spurs in FIGS. 5-10 are similar to the fixed frequency spur 290. Although the chirp signals are shown in FIGS. 5-10 with an increasing frequency from f_low to f_high during Trise, in some implementations, the chirp signals have a decreasing frequency from f_high to f_low during Trise. In these implementations, the frequency of the chirp signals increases from f_low to f_high during Tfall, and stays constant at f_high during the optional idle period Tidle.

Figure 5:
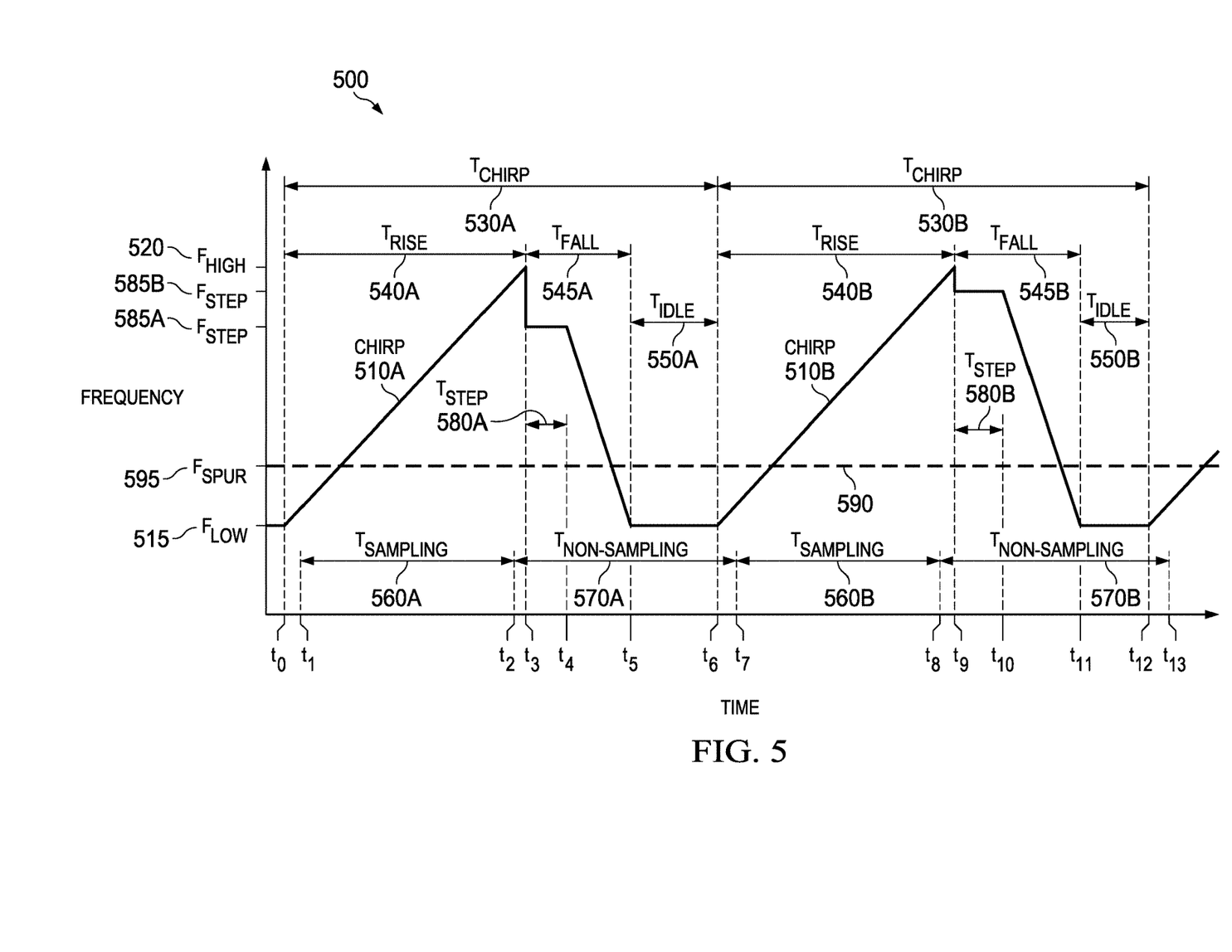
FIG. 5 illustrates an example waveform of chirp signals with frequency steps introduced with dithered frequencies during a non-active time period and a fixed frequency spur.

FIG. 5 illustrates an example waveform 500 of chirp signals 510A and 510B with frequency steps introduced with dithered frequencies during a non-active time period Tnon-sampling 570A and 570B, respectively, and a fixed frequency spur 590. For chirp signal 510A, the chirp controller 420 introduces a frequency step at the beginning of Tfall 545A at a frequency f_step 585A for a time period Tstep 580 between time t3 and time t4. For the subsequent chirp signal 510B, the chirp controller 420 introduces a frequency step at the beginning of Tfall 545B at a frequency f_step 585B for the time period Tstep 580 between time t9 and t10. The period Tstep 580 of the frequency steps in chirps 510A and 510B is the same in this example, and the frequency steps in chirps 510A and 510B occur at the beginning of Tfall 545A and 545B, respectively. The frequencies f_step 585A and f_step 585B are randomized by the LFSR circuit 430 between f_low 515 and f_high 520.

Figure 6:
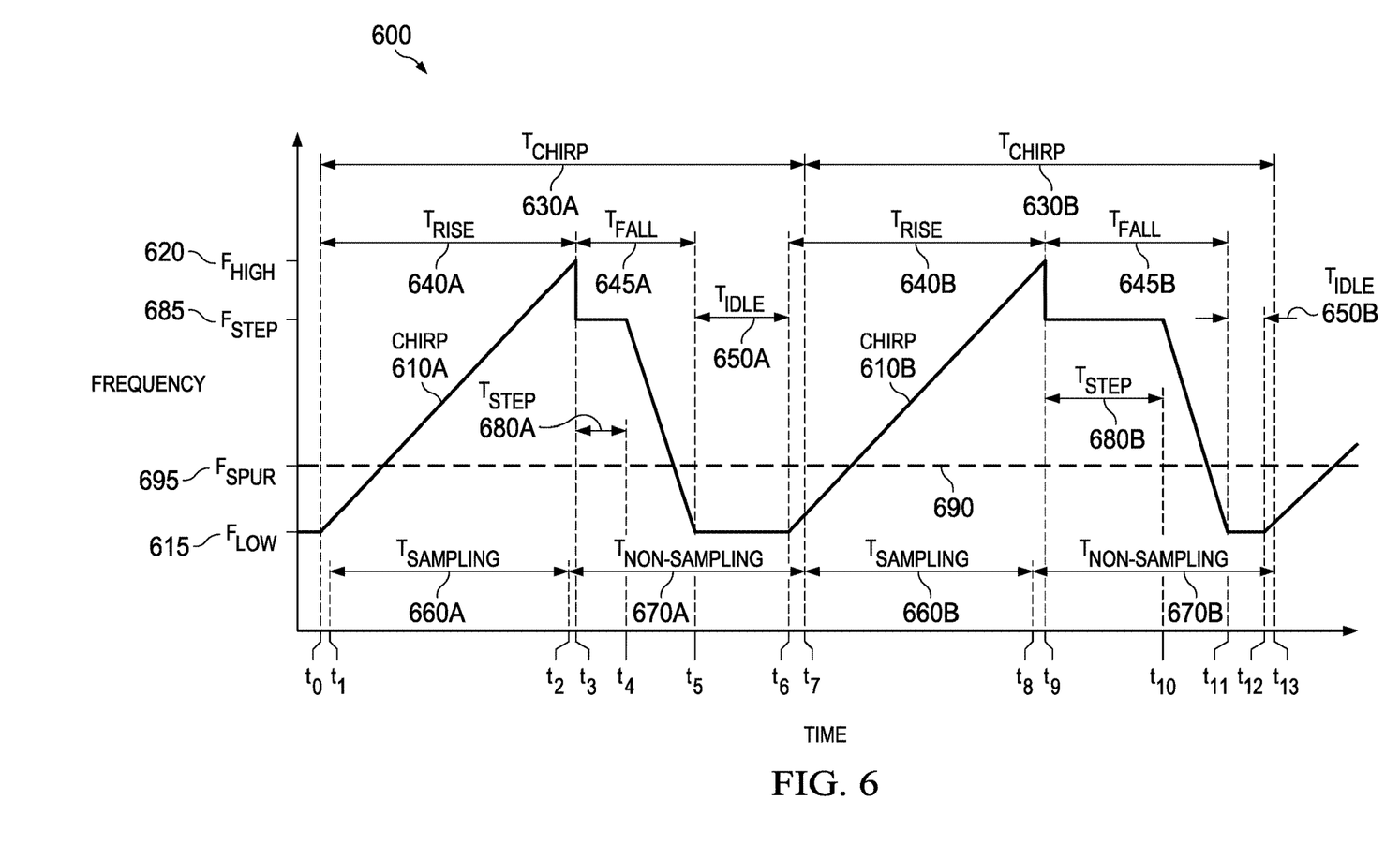
FIG. 6 illustrates another example waveform of chirp signals with frequency steps introduced for dithered time periods during a non-active time period and a fixed frequency spur.

FIG. 6 illustrates another example waveform 600 of chirp signals 610A and 610B with frequency steps introduced for dithered time periods during a non-active time period Tnon-sampling 670A and 670B, respectively, and a fixed frequency spur 690. For chirp signal 610A, the chirp controller 420 introduces a frequency step at the beginning of Tfall 645A at a frequency f_step 685 for a time period Tstep 680A between time t3 and time t4. For the subsequent chirp signal 610B, the chirp controller 420 introduces a frequency step at the beginning of Tfall 645B at the frequency f_step 685 for a time period Tstep 680B between time t9 and t10.

The frequency f_step 685 is the same for the frequency steps in both chirps 610A and 610B in this example, and the frequency steps in chirps 610A and 610B occur at the beginning of Tfall 645A and 645B, respectively. The periods Tstep 680A and Tstep 680B are randomized by the LFSR circuit 430, and the corresponding idle periods Tidle 650A and Tidle 650B are adjusted to maintain a constant chirp period Tchirp 630 and a constant non-sampling period Tnon-sampling 670, which prevents Doppler noise.

Figure 7:
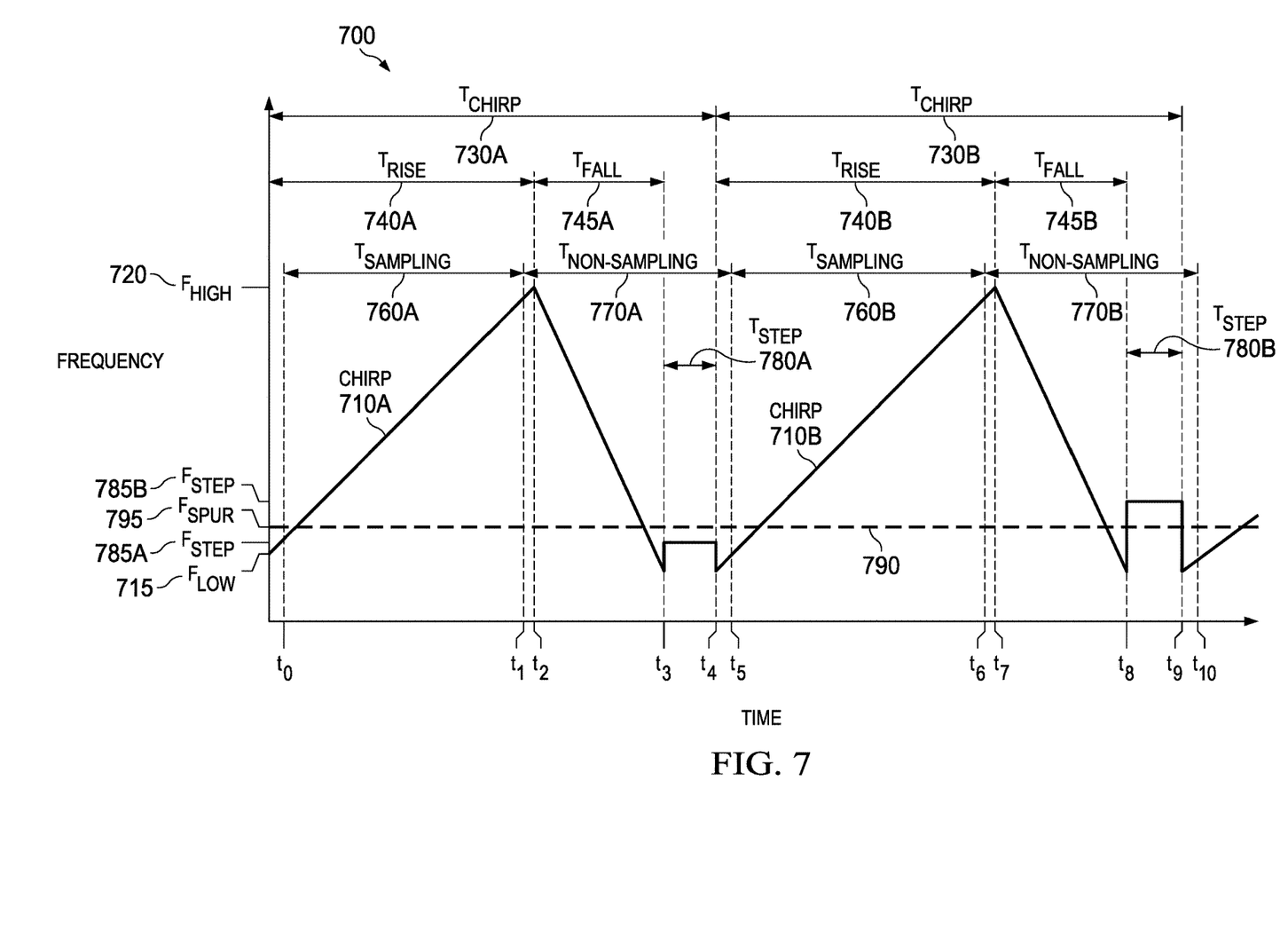
FIG. 7 illustrates a further example waveform of chirp signals with frequency steps introduced with dithered frequencies and/or for dithered time periods during a non-active time period and a fixed frequency spur.

FIG. 7 illustrates a further example waveform 700 of chirp signals 710A and 710B with frequency steps introduced with dithered frequencies and/or for dithered time periods during a non-active time period Tnon-sampling 770A and 770B, respectively, and a fixed frequency spur 790. For chirp signal 710A, the chirp controller 420 introduces a frequency step after Tfall 745A ends, at a frequency f_step 785A for a time period Tstep 780A between time t3 and time t4. In this example, chirp signal 710A does not include the optional idle period such as idle period Tidle 250 in chirp signal 210, but in other implementations, the chirp signal 710A includes an optional idle period Tidle 750A (not shown).

For the subsequent chirp signal 710B, the chirp controller 420 introduces a frequency step after Tfall 745B ends, at a frequency f_step 785B for a time period Tstep 780B between time t8 and t9. In this example, chirp signal 710B does not include an optional idle period such as idle period Tidle 250 in chirp signal 210, but in other implementations, the chirp signal 710B includes an optional idle period Tidle 750B (not shown). The frequency steps in chirps 710A and 710B occur at the end of Tfall 745A and 745B, respectively.

The periods Tstep 780A and 780B, the frequencies f_step 785A and 785B, or both are randomized by the LFSR circuit 430. In response to the periods Tstep 780A and 780B being randomized, the corresponding idle periods Tidle 750A and 750B are adjusted to maintain a constant chirp period Tchirp 730 and a constant non-sampling period Tnon-sampling 770, which prevents Doppler noise.

Figure 8:
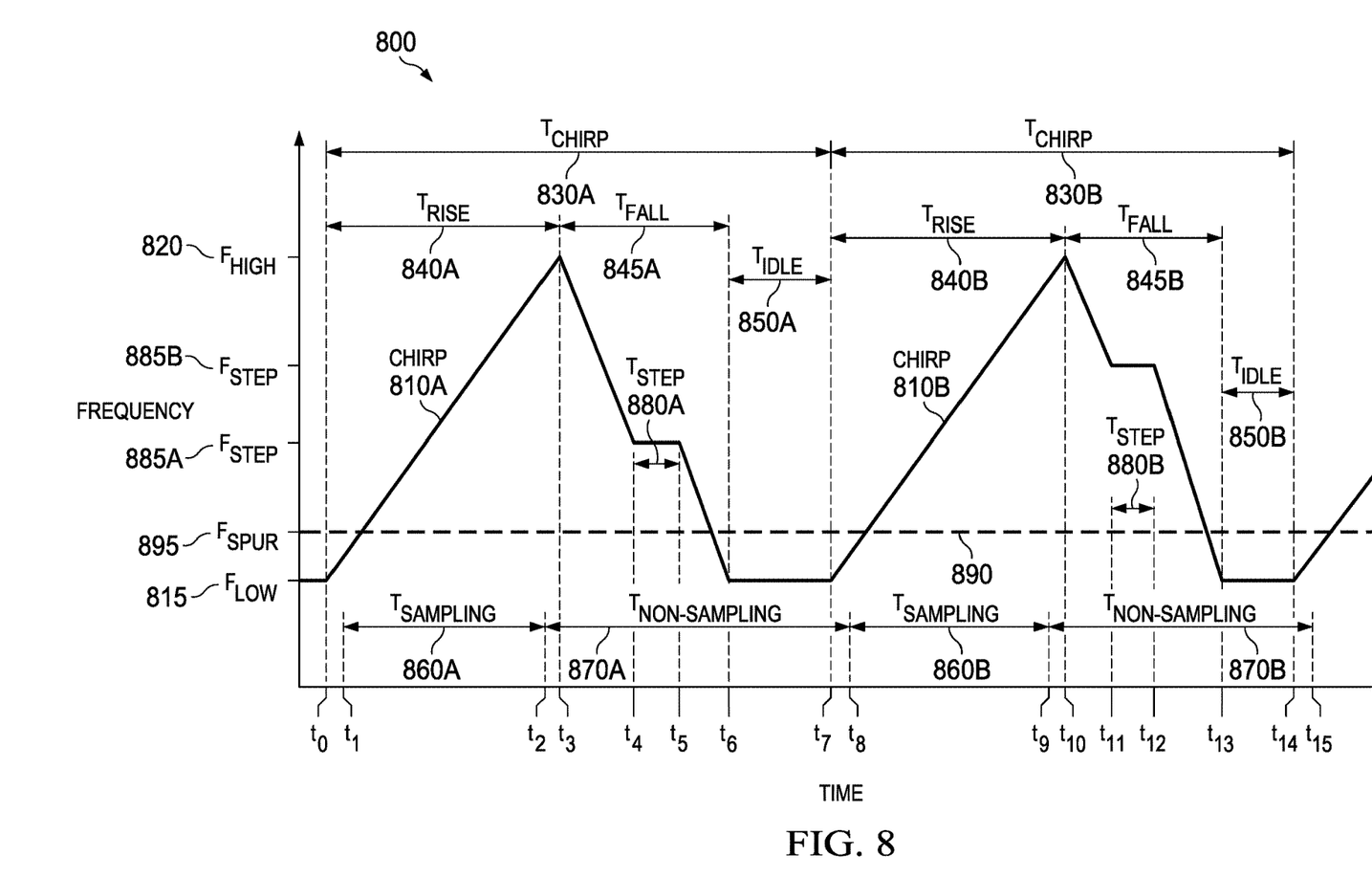
FIG. 8 illustrates another example waveform of chirp signals with "hold" frequency steps introduced at dithered frequencies and/or for dithered time periods during a non-active time period and a fixed frequency spur.

FIG. 8 illustrates another example waveform 800 of chirp signals 810A and 810B with "hold" frequency steps introduced at dithered frequencies and/or for dithered time periods during a non-active time period Tnon-sampling 870A and 870B, respectively, and a fixed frequency spur 890. For chirp signal 810A, the chirp controller 420 introduces a frequency step partway through Tfall 845A at a frequency f_step 885A for a time period Tstep 880A between time t4 and time t5. The frequency step amounts to a "hold" in chirp 810A at the frequency f_step 885A for the period Tstep 880A. That is, the frequency of chirp 810A decreases from f_high 820 during Tfall 845A to the frequency f_step 885A, maintains the frequency f_step 885A for the period Tstep 880A, and continues decreasing to f_low 815.

For the subsequent chirp signal 810B, the chirp controller 420 introduces a frequency step partway through Tfall 845B at the frequency f_step 885B for a time period Tstep 880B between time t11 and time t12. The frequency step amounts to a "hold" in chirp 810B at the frequency f_step 885B for the period Tstep 880B. That is, the frequency of chirp 810B decreases from f_high 820 during Tfall 845B to the frequency f_step 885B, maintains the frequency f_step 885B for the period Tstep 880B, and continues decreasing to f_low 815. The periods Tstep 880A and 880B, the frequencies f_step 885A and 885B (and by extension, the time within Tfall 845A and 845B of the frequency step), or both are randomized by the LFSR circuit 430. In response to the periods Tstep 880A and 880B being randomized, the corresponding idle periods Tidle 850A and 850B are adjusted to maintain a constant chirp period Tchirp 830 and a constant non-sampling period Tnon-sampling 870, which prevents Doppler noise.

Figure 9:
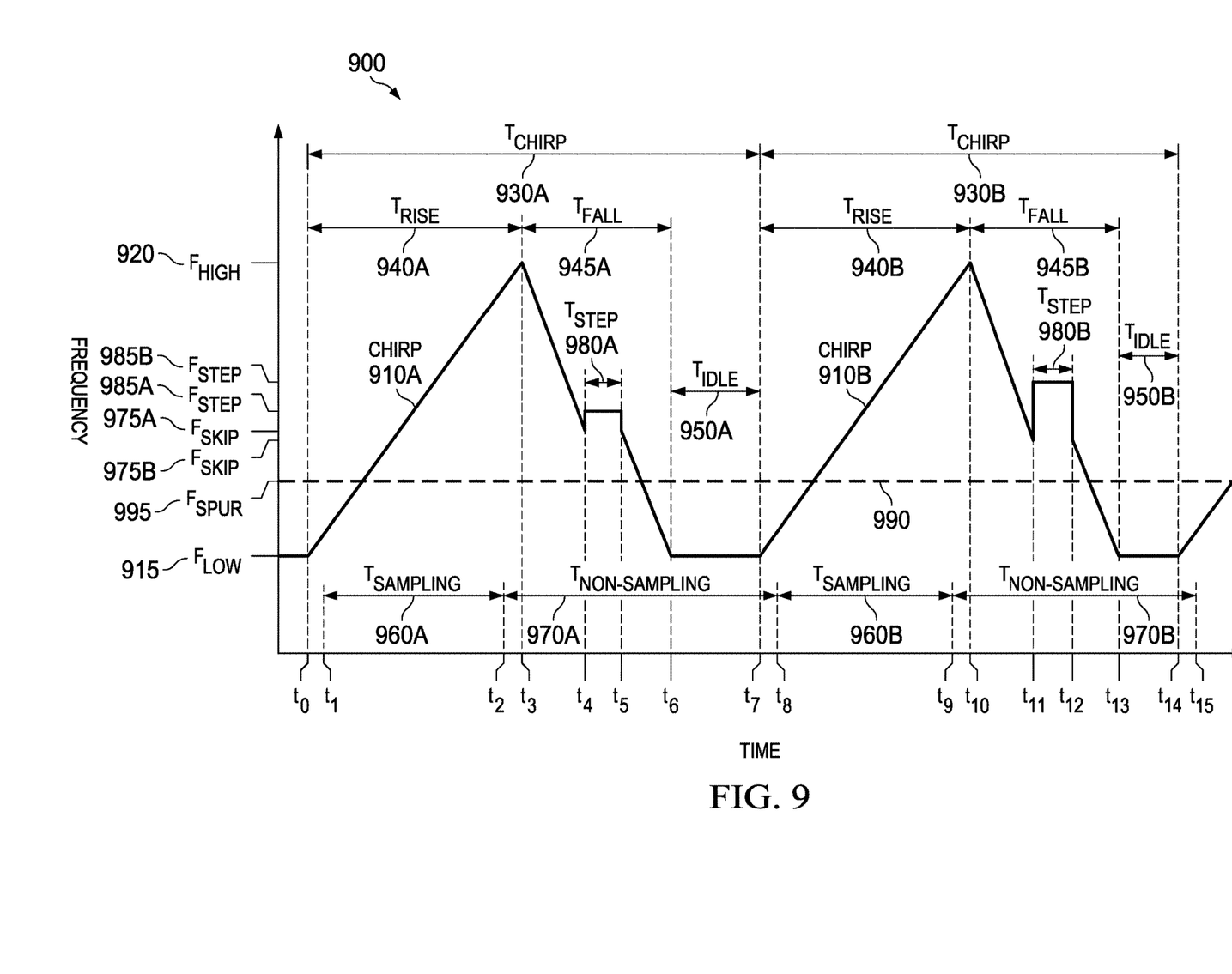
FIG. 9 illustrates a further example waveform of chirp signals with "skip" frequency steps introduced at dithered frequencies and/or for dithered time periods during a non-active time period and a fixed frequency spur.

FIG. 9 illustrates a further example waveform 900 of chirp signals 910A and 910B with "skip" frequency steps introduced at dithered frequencies and/or for dithered time periods during a non-active time period Tnon-sampling 970A and 970B, respectively, and a fixed frequency spur 990. For chirp signal 910A, the chirp controller 420 introduces a skip frequency step partway through Tfall 945A at a frequency f_step 985A for a time period Tstep 980A between time t4 and time t5. The skip frequency step amounts to a "skip" in chirp 910A at the frequency f_step 985A for the period Tstep 980A. That is, the frequency of chirp 910A decreases from f_high 920 during Tfall 945A to a frequency f_skip 975A, skips to the frequency f_step 985A for the period Tstep 980A, returns to the frequency f_skip 975A, and decreases to f_low 915.

For the subsequent chirp signal 910B, the chirp controller 420 introduces a skip frequency step partway through Tfall 945B at the frequency f_step 985B for a time period Tstep 980B between time t11 and time t12. The skip frequency step amounts to a "skip" in chirp 910B at the frequency f_step 985B for the period Tstep 980B. That is, the frequency of chirp 910B decreases from f_high 920 during Tfall 945B to a frequency f_skip 975B, skips to the frequency f_step 985B for the period Tstep 980B, returns to the frequency f_skip 975B, and decreases to f_low 915. The frequencies f_skip 975A and 975B, the periods Tstep 980A and 980B, the frequencies f_step 985A and 985B, or any combination thereof are randomized by the LFSR circuit 430. In response to the period Tstep 980A and 980B being randomized, the corresponding idle periods Tidle 950A and 950B are adjusted to maintain a constant chirp period Tchirp 930 and a constant non-sampling period Tnon-sampling 970, which prevents Doppler noise.

Figure 10:
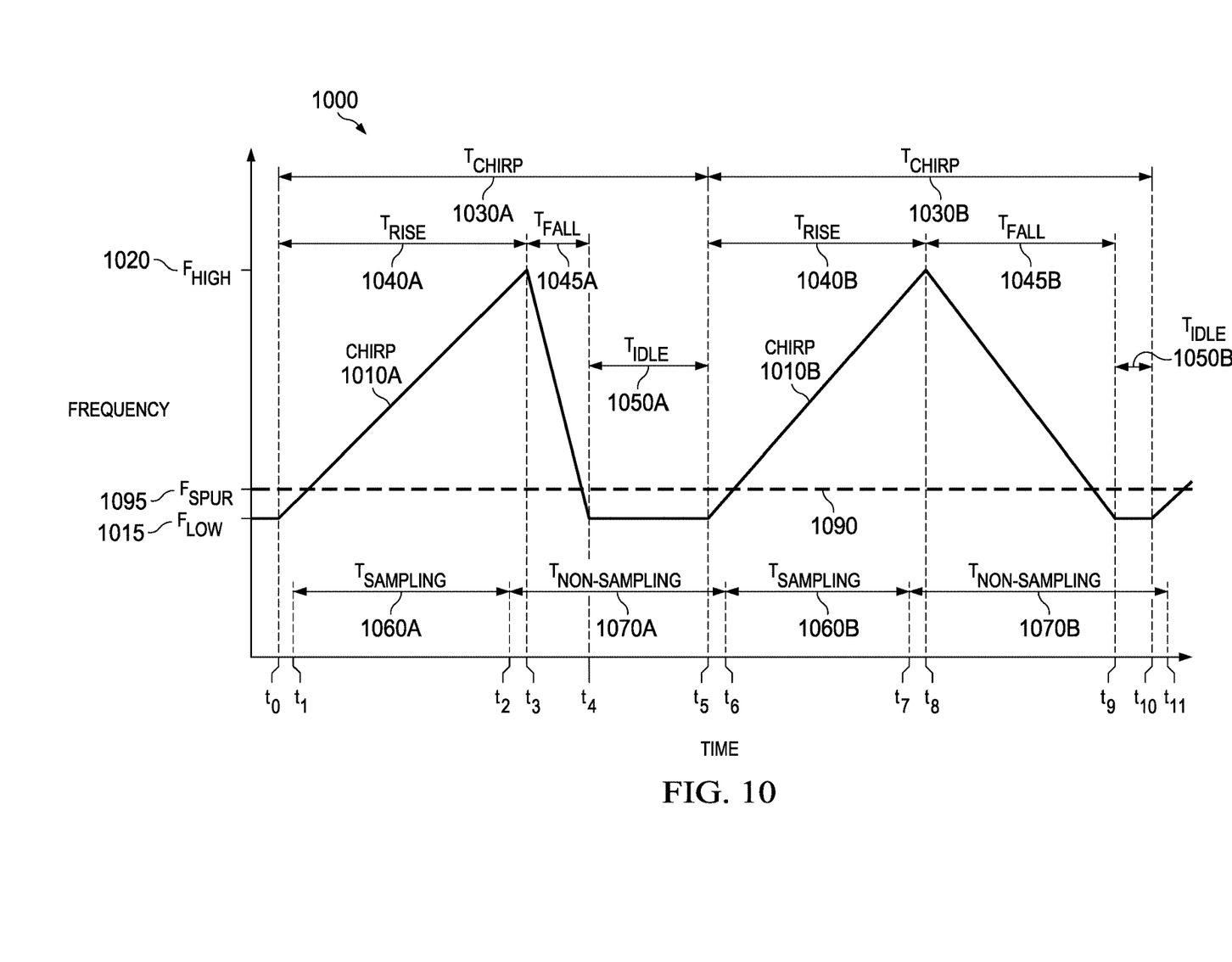
FIG. 10 illustrates another example waveform of chirp signals with dithered falling periods during a non-active time period and a fixed frequency spur.

FIG. 10 illustrates another example waveform 1000 of chirp signals 1010A and 1010B with dithered falling periods Tfall 1045A and 1045B, respectively, during a non-active time period 1070A and 1070B, respectively, and a fixed frequency spur 1090. For chirp signal 1010A, the LFSR circuit 430 randomizes a length of Tfall 1045A, and chirp controller 420 compresses the decrease in frequency from f_high 1020 to f_low 1015 into a shorter Tfall 1045A. The corresponding idle period Tidle 1050A is extended to maintain a constant chirp period Tchirp 1030A and non-sampling period Tnon-sampling 1070A. In contrast for chirp signal 1010B, the LFSR circuit 430 randomizes a length of Tfall 1045B, and chirp controller 420 extends the decrease in frequency from f_high 1020 to f_low 1015 into a longer Tfall 1045B. The corresponding idle period Tidle 1050B is compressed to maintain a constant chirp period Tchirp 1030B and non-sampling period Tnon-sampling 1070B.

Figure 11:
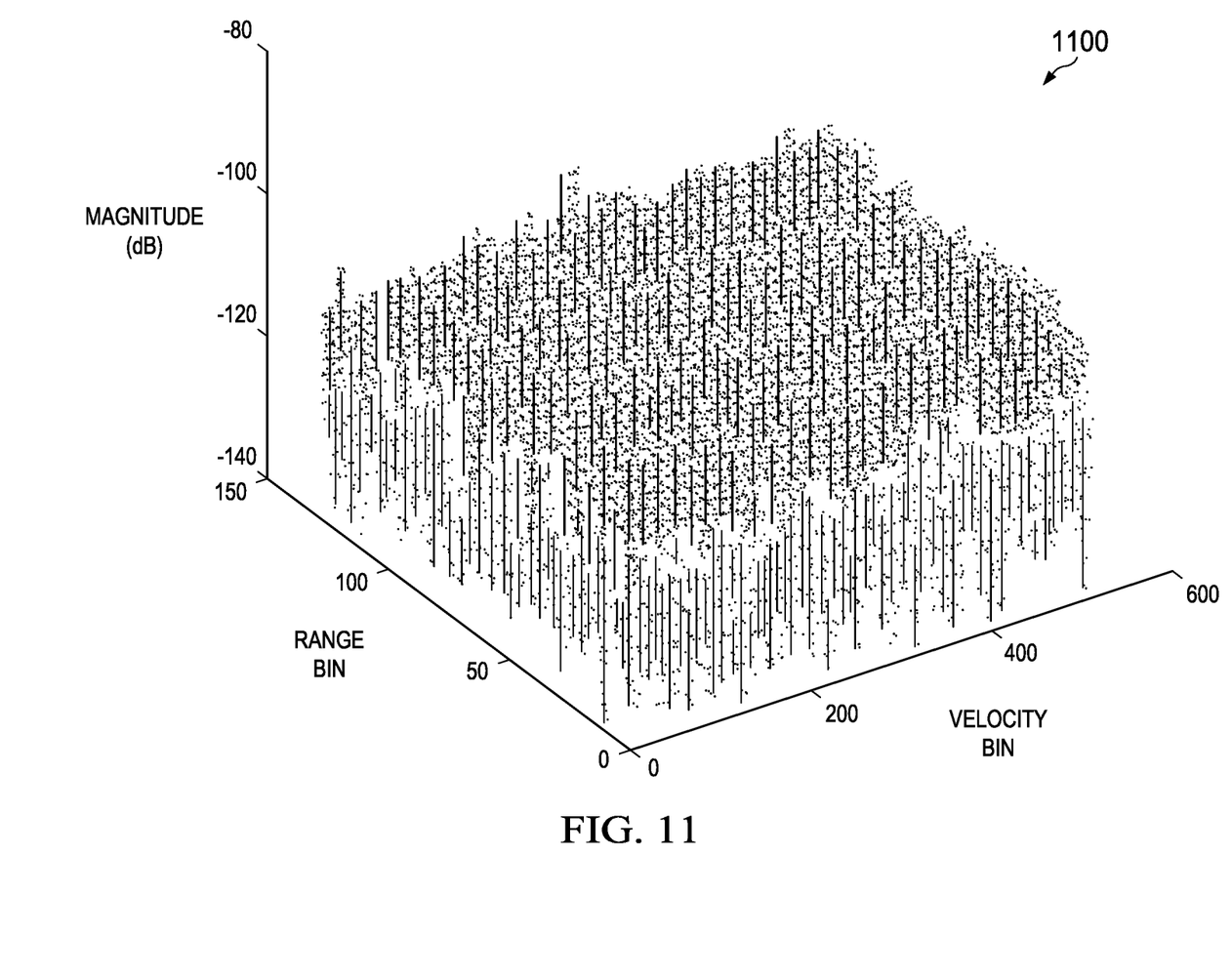
FIG. 11 illustrates a waveform of a Doppler FFT for the chirp signals with frequency steps introduced with dithered frequencies during a non-active time period and fixed frequency spur shown in FIG. 5.

FIG. 11 illustrates a range-velocity plot 1100 as a function of signal power in decibels (dB) for the received chirp signals dithered during the non-active time period and fixed frequency spur shown in FIG. 5. The frequency steps introduced with dithered frequencies f_step 585A and f_step 585B randomize the phase of the synthesizer PLL 145, and spreads the noise of the fixed frequency spur 590 across all Doppler bins, such that no spur ridges are present in plot 1100 and ghost targets are not detected.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement.

Unless otherwise stated, "about," "approximately," or "substantially" preceding a value means +/−10 percent of the stated value. Modifications are possible in the described examples, and other examples are possible within the scope of the claims.

Modifications are possible in the described embodiments, and other embodiments are possible, within the scope of the claims.

What is claimed is:

1. A non-transitory computer-readable storage device storing machine instructions which, when executed by one or more processors, cause the one or more processors to:
   determine a chirp period Tc for radar chirps in a radar frame, wherein the chirp period Tc comprises a rising period Trise and a falling period Tfall;
   determine, for each radar chirp in the radar frame, a corresponding randomized frequency characteristic during Tfall; and
   cause a radar sensor circuit to generate the radar chirps in the radar frame based on Tc, Trise, Tfall, and the corresponding randomized frequency characteristics.

2. The storage device of claim 1, wherein the machine instructions to determine the corresponding randomized frequency characteristic comprise machine instructions to determine a frequency step having a frequency f_step and a period Tstep, wherein at least one of the frequency f_step and the period Tstep is dithered across radar chirps in the radar frame.

3. The storage device of claim 2, wherein the machine instructions to determine the corresponding randomized frequency characteristic further comprise machine instructions to adjust, for each radar chirp in the radar frame, a corresponding idle period Tidle based on the period Tstep to maintain the chirp period Tc.

4. The storage device of claim 2, wherein the machine instructions to cause the radar sensor circuit to generate the radar chirps comprise machine instructions to, for each radar chirp in the radar frame:
- transition, during the rising period Trise, the radar chirp from a starting frequency to an ending frequency;
- maintain, during the period Tstep, the radar chirp at the frequency f_step; and
- transition, during a remainder of the falling period Tfall, the radar chirp from the frequency f_step to the starting frequency.

5. The storage device of claim 2, wherein the machine instructions to cause the radar sensor circuit to generate the radar chirps comprise machine instructions to, for each radar chirp in the radar frame:
- transition, during the rising period Trise, the radar chirp from a starting frequency to an ending frequency;
- transition, during the falling period Tfall, the radar chirp from the ending frequency to the starting frequency; and
- maintain, for the period Tstep, the radar chirp at the frequency f_step.

6. The storage device of claim 2, wherein the machine instructions to cause the radar sensor circuit to generate the radar chirps comprise machine instructions to, for each radar chirp in the radar frame:
- transition, during the rising period Trise, the radar chirp from a starting frequency to an ending frequency;
- transition, during a first portion of the falling period Tfall, the radar chirp from the ending frequency to the frequency f_step;
- maintain, during a second portion of the falling period Tfall and for the period Tstep, the radar chirp at the frequency f_step; and
- transition, during a third portion of the falling period Tfall, the radar chirp from the frequency f_step to the starting frequency.

7. The storage device of claim 2, wherein the machine instructions to determine the frequency step comprise machine instructions to determine a skipping frequency f_skip, wherein at least one of the frequency f_step, the period Tstep, and the skipping frequency f_skip is dithered across radar chirps in the radar frame.

8. The storage device of claim 7, wherein the machine instructions to cause the radar sensor circuit to generate the radar chirps comprise machine instructions to, for each radar chirp in the radar frame:
- transition, during the rising period Trise, the radar chirp from a starting frequency to an ending frequency;
- transition, during a first portion of the falling period Tfall, the radar chirp from the ending frequency to the skipping frequency f_skip;
- maintain, during a second portion of the falling period Tfall and for the period Tstep, the radar chirp at the frequency f_step; and
- transition, during a third portion of the falling period Tfall, the radar chirp from the skipping frequency f_skip to the starting frequency.

9. The storage device of claim 1, wherein the machine instructions to determine the corresponding randomized frequency characteristic comprise machine instructions to determine a length of the falling period Tfall, wherein the length of the falling period Tfall is dithered across radar chirps in the radar frame.

10. An apparatus, comprising:
- one or more processors; and
- one or more non-transitory computer-readable media storing machine instructions which, when executed by the one or more processors, cause the one or more processors to:
  - determine a chirp period Tc for radar chirps in a radar frame, wherein the chirp period Tc comprises a rising period Trise and a falling period Tfall;
  - determine, for each radar chirp in the radar frame, a corresponding randomized frequency characteristic during Tfall; and
  - cause a radar sensor circuit to generate the radar chirps in the radar frame based on Tc, Trise, Tfall, and the corresponding randomized frequency characteristics.

11. The apparatus of claim 10, further comprising the radar sensor circuit, wherein the radar sensor circuit comprises:
- a synthesizer phase locked loop (PLL);
- a frequency multiplier coupled to the synthesizer PLL;
- a transmitter circuit coupled to the frequency multiplier;
- a receiver circuit; and
- a baseband processor coupled to the receiver circuit and the frequency multiplier.

12. The apparatus of claim 11, wherein the corresponding randomized frequency characteristics of the radar chirps randomize initial phases of the synthesizer PLL for the radar chirps.

13. The apparatus of claim 10, further comprising a chirp controller, wherein the chirp controller comprises a linear feedback shift register circuit configured to determine the corresponding randomized frequency characteristics of the radar chirps.

14. The apparatus of claim 10, wherein the machine instructions to determine the corresponding randomized frequency characteristic comprise machine instructions to determine a frequency step having a frequency f_step and a period Tstep, wherein at least one of the frequency f_step and the period Tstep is dithered across radar chirps in the radar frame.

15. The apparatus of claim 14, wherein the machine instructions to determine the corresponding randomized frequency characteristic further comprise machine instructions to adjust, for each radar chirp in the radar frame, a corresponding idle period Tidle based on the period Tstep to maintain the chirp period Tc.

16. The apparatus of claim 14, wherein the machine instructions to cause the radar sensor circuit to generate the radar chirps comprise machine instructions to, for each radar chirp in the radar frame:
- transition, during the rising period Trise, the radar chirp from a starting frequency to an ending frequency;
- maintain, during the period Tstep, the radar chirp at the frequency f_step; and
- transition, during a remainder of the falling period Tfall, the radar chirp from the frequency f_step to the starting frequency.

17. The apparatus of claim 14, wherein the machine instructions to cause the radar sensor circuit to generate the radar chirps comprise machine instructions to, for each radar chirp in the radar frame:
- transition, during the rising period Trise, the radar chirp from a starting frequency to an ending frequency;
- transition, during the falling period Tfall, the radar chirp from the ending frequency to the starting frequency; and maintain, for the period Tstep, the radar chirp at the frequency f_step.

18. The apparatus of claim 14, wherein the machine instructions to cause the radar sensor circuit to generate the radar chirps comprise machine instructions to, for each radar chirp in the radar frame:

transition, during the rising period Trise, the radar chirp from a starting frequency to an ending frequency;

transition, during a first portion of the falling period Tfall, the radar chirp from the ending frequency to the frequency f_step;

maintain, during a second portion of the falling period Tfall and for the period Tstep, the radar chirp at the frequency f_step; and transition, during a third portion of the falling period Tfall, the radar chirp from the frequency f_step to the starting frequency.

19. The apparatus of claim 14, wherein the machine instructions to determine the frequency step comprise machine instructions to determine a skipping frequency f_skip, wherein at least one of the frequency f_step, the period Tstep, and the skipping frequency f_skip is dithered across radar chirps in the radar frame.

20. The apparatus of claim 19, wherein the machine instructions to cause the radar sensor circuit to generate the radar chirps comprise machine instructions to, for each radar chirp in the radar frame:

transition, during the rising period Trise, the radar chirp from a starting frequency to an ending frequency;

transition, during a first portion of the falling period Tfall, the radar chirp from the ending frequency to the skipping frequency f_skip;

maintain, during a second portion of the falling period Tfall and for the period Tstep, the radar chirp at the frequency f_step; and transition, during a third portion of the falling period Tfall, the radar chirp from the skipping frequency f_skip to the starting frequency.

21. The apparatus of claim 10, wherein the machine instructions to determine the corresponding randomized frequency characteristic comprise machine instructions to determine a length of the falling period Tfall, wherein the length of the falling period Tfall is dithered across radar chirps in the radar frame.

22. A method, comprising:

determining a chirp period Tc for radar chirps in a radar frame, wherein the chirp period Tc comprises a rising period Trise and a falling period Tfall;

determining, for each radar chirp in the radar frame, a corresponding randomized frequency characteristic during Tfall; and causing a radar sensor circuit to generate the radar chirps in the radar frame based on Tc, Trise, Tfall, and the corresponding randomized frequency characteristics.

23. The method of claim 22, wherein determining the corresponding randomized frequency characteristic comprises determining a frequency step having a frequency f_step and a period Tstep, wherein at least one of the frequency f_step and the period Tstep is dithered across radar chirps in the radar frame.

24. The method of claim 22, wherein determining the corresponding randomized frequency characteristic comprises determining a length of the falling period Tfall, wherein the length of the falling period Tfall is dithered across radar chirps in the radar frame.

* * * * *